United States Patent
Cross et al.

(10) Patent No.: US 7,744,763 B2
(45) Date of Patent: Jun. 29, 2010

(54) MERCURY REMOVAL SORBENT

(75) Inventors: Joseph B. Cross, Bartlesville, OK (US); Glenn W. Dodwell, Bartlesville, OK (US); Marvin M. Johnson, Bartlesville, OK (US); Edward L. Sughrue, II, Bartlesville, OK (US); Jianhua Yao, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/175,317

(22) Filed: Jul. 17, 2008

(65) Prior Publication Data

US 2008/0279739 A1    Nov. 13, 2008

Related U.S. Application Data

(62) Division of application No. 11/071,632, filed on Mar. 3, 2005, now abandoned.

(51) Int. Cl.
*C02F 1/42* (2006.01)
*B01J 23/00* (2006.01)
*B01J 21/00* (2006.01)
*B01J 20/00* (2006.01)

(52) U.S. Cl. .............. 210/660; 210/688; 210/914; 502/516; 502/247; 502/344; 502/353; 502/354; 502/400; 502/415; 502/439

(58) Field of Classification Search .............. 95/95, 95/107, 108, 129, 133, 134; 423/210, 215.5, 423/235; 502/247, 344, 353, 354, 355, 400, 502/415, 439, 516; 429/231, 231.95; 210/660, 210/688, 914
See application file for complete search history.

(56) References Cited

U.S. PATENT DOCUMENTS

| | | | | | |
|---|---|---|---|---|---|
| 4,092,271 | A | * | 5/1978 | Sze | 502/243 |
| 4,401,572 | A | * | 8/1983 | Chu et al. | 210/681 |
| 5,080,799 | A | * | 1/1992 | Yan | 210/661 |
| 5,096,681 | A | * | 3/1992 | Cheung | 423/245.1 |
| 5,281,258 | A | * | 1/1994 | Markovs | 95/120 |
| 5,354,357 | A | * | 10/1994 | Markovs et al. | 75/670 |
| 5,607,496 | A | * | 3/1997 | Brooks | 75/670 |
| 5,785,932 | A | * | 7/1998 | Helfritch | 422/186.04 |
| 6,248,217 | B1 | * | 6/2001 | Biswas et al. | 204/157.4 |
| 6,719,828 | B1 | * | 4/2004 | Lovell et al. | 95/134 |
| 7,048,781 | B1 | * | 5/2006 | Lovell | 95/134 |
| 7,381,243 | B2 | * | 6/2008 | Alvarez et al. | 95/116 |
| 2003/0104937 | A1 | * | 6/2003 | Sinha | 502/400 |
| 2003/0155302 | A1 | | 8/2003 | Meng et al. | |
| 2003/0170159 | A1 | * | 9/2003 | Honjo et al. | 423/210 |
| 2004/0202596 | A1 | * | 10/2004 | Honjo et al. | 423/210 |
| 2004/0253158 | A1 | * | 12/2004 | Honjo et al. | 423/210 |
| 2005/0112042 | A1 | * | 5/2005 | Honjo et al. | 423/210 |
| 2005/0112044 | A1 | * | 5/2005 | Kuma et al. | 423/210 |
| 2005/0207955 | A1 | * | 9/2005 | Wang | 423/210 |

* cited by examiner

*Primary Examiner*—Cam N Nguyen

(57) ABSTRACT

A composition comprising a vanadium oxide compound and an alkali metal promoter loaded onto a porous support material is disclosed. Methods of making and using the composition to remove heavy metals or heavy metal containing compounds from a fluid stream are also provided. Such methods are particularly useful in the removal of mercury and mercury compounds from flue gas streams produced from the combustion of hydrocarbon-containing materials such as coal and petroleum fuels.

25 Claims, 2 Drawing Sheets

MERCURY REMOVAL SORBENT

This is a divisional of application Ser. No. 11/071,632 filed Mar. 3, 2005, now abandoned.

The invention relates to a composition and method for removing heavy metal contaminates from fluid streams. In one aspect, the invention relates to a method of preparing such composition. In yet another aspect, the invention relates to a process for removing heavy metal contaminates, such as mercury and mercury compounds, from flue gas streams produced from the combustion of hydrocarbon-containing materials.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury, and barium. Most of these heavy metals are toxic to humans and animals. In particular, elemental mercury and mercury compounds such as mercury chlorides are thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants and petroleum refineries, will be reduced by future legislation. While a variety of adsorbents are available for capture of heavy metals (in particular mercury), these adsorbents tend to have low capacities and are easily deactivated by other components in the gas stream, such as sulfur oxides. Thus, there exists a need for a material that removes elemental mercury from gas streams and has a high capacity for retaining mercury as a nonvolatile compound.

SUMMARY OF THE INVENTION

It is an object of the present invention to provide an improved vanadium material with a high capacity for sorbing heavy metals and heavy metal compounds.

A further object of this invention is to provide a method for making an improved vanadium material by incorporating a vanadium oxide compound and an alkali metal hydroxide promoter with a porous support material.

Another object of this invention is to provide a process for removing heavy metals or heavy metal compounds from a fluid stream by contacting the fluid stream with an improved vanadium material.

Yet another object of this invention is to provide an improved vanadium material which when used in the removal of heavy metals results in the oxidation of the heavy metal to an oxidation state greater than zero.

It should be understood that the above-listed objects are only exemplary, and not all the objects listed above need be accomplished by the invention described and claimed herein.

In accordance with a first embodiment of the invention, the inventive composition comprises a porous support material including a vanadium oxide compound and an alkali metal vanadate incorporated thereon, therein, or thereon and therein.

In accordance with a second embodiment of the invention, the inventive composition comprises a porous support material impregnated with a vanadium oxide compound and an alkali metal promoter selected from the group consisting of lithium hydroxide, lithium vanadate, and mixtures thereof.

In accordance with a third embodiment of the invention, the inventive composition can be prepared by the method of: (a) mixing a vanadium oxide compound and an alkali metal hydroxide promoter with at least one porous support material.

In accordance with a fourth embodiment of the invention, the inventive composition can be used in the removal of at least one heavy metal or heavy metal containing compound from a fluid stream by (a) contacting the fluid stream with a porous support material having incorporated onto, into, or onto and into a vanadium oxide compound and an alkali metal promoter for sorption of at least a portion of the at least one heavy metal or heavy metal containing compound.

In accordance with a fifth embodiment of the invention, the inventive composition can be used in the removal of at least one heavy metal or heavy metal containing compound from a flue gas stream produced by the combustion of a hydrocarbon-containing fuel by: (a) contacting the flue gas stream with a first sorbent material comprising a porous support having incorporated onto, into, or onto and into a vanadium oxide compound and an alkali metal promoter for sorbing at least a portion of the at least one heavy metal or heavy metal containing compound present in the flue gas stream; and (b) contacting the flue gas with a second sorbent material different from the first sorbent material for sorbing at least a portion of the at least one heavy metal-containing compound not sorbed during step (a).

Other objects and advantages of the invention will become apparent from the detailed description and the appended claims.

BRIEF DESCRIPTION OF THE FIGURES

A preferred embodiment of the present invention is described in detail below with reference to the attached figures, wherein.

DETAILED DESCRIPTION OF THE INVENTION

Figure 1:
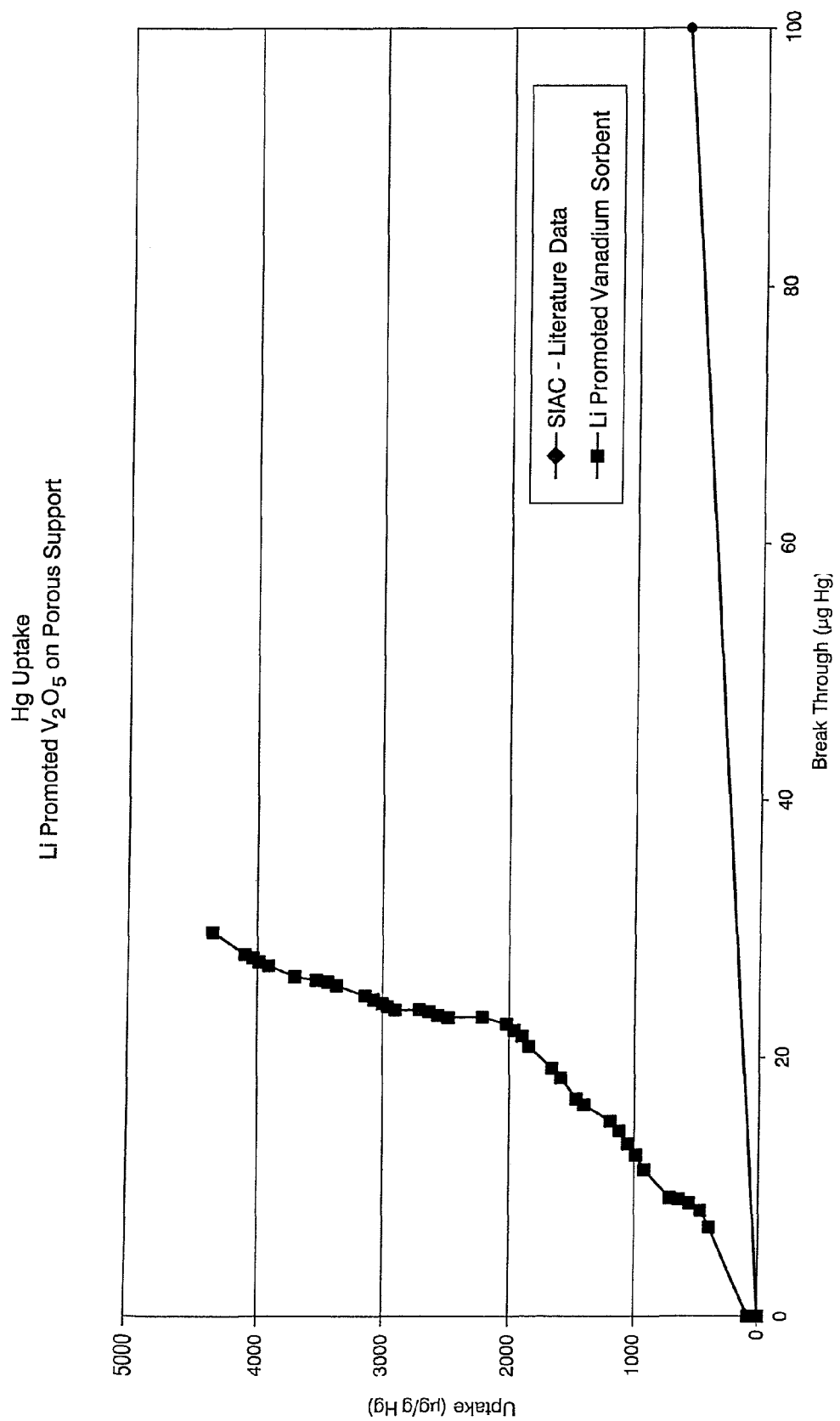
FIG. 1 is a graph of mercury uptake versus mercury breakthrough for a lithium promoted $V_2O_5$ sorbent on a porous support compared to a conventional activated charcoal sorbent.

Compositions according to the present invention generally comprise a porous support material with a vanadium oxide compound and an alkali metal promoter incorporated thereon, therein, or thereon and therein. Preferably, the vanadium oxide compound comprises $V_2O_5$, a hydrate of $V_2O_5$, a peroxo complex of vanadium oxide or combinations thereof. However, it is within the scope of the invention for the vanadium component to have any oxidation state greater than zero.

An alkali metal promoter is employed to increase the effectiveness of the vanadium oxide in sorbing heavy metals. Preferably, the alkali metal promoter is an alkali metal hydroxide such as lithium hydroxide. As discussed below, during formation of the inventive compositions, it is possible for at least a portion of the alkali metal hydroxide promoter to react with at least a portion of the vanadium oxide compound to form an alkali metal vanadate such as lithium vanadate. Hydrates of alkali metal hydroxides can also be used such as lithium hydroxide monohydrate. However, it is within the scope of the present invention for the promoter to be an elemental alkali metal, an alkali metal compound, or an ionic alkali metal species. Unless otherwise specified, the term "promoter" refers to any such alkali metal composition whether it was originally added to the inventive sorbent or whether it was formed in situ.

The vanadium oxide compound and promoter are loaded onto a porous support material. Preferably, the support material is selected from the group consisting of amorphous silica-alumina, a zeolite, a material comprising meta-kaolin, alumina, expanded perlite, and combinations thereof. It is most preferable to employ a silica-alumina support material such as meta-kaolin in conjunction with expanded perlite, however, it is possible that the support may comprise pure alumina or calcined alumina.

The porous support material generally comprises at least about 50% by weight of the total composition, preferably between about 50-99% by weight, more preferably between about 75-95% by weight, and most preferably between about 80-9% by weight. In order to maximize the sorptive capacity of the composition, the support material preferably has a surface area of at least about 75 m$^2$/g, more preferably at least about 100 m$^2$/g, and most preferably at least about 150 m$^2$/g.

The overall composition preferably comprises from about 0.5-40% by weight vanadium. Unless otherwise specified, the phrase "by weight vanadium" is defined as the elemental weight of vanadium present in the composition. More preferably, the composition comprises from about 1-35% by weight vanadium, and most preferably from about 2%-25% by weight.

The composition preferably comprises from about 0.5-50% by weight of the alkali metal promoter, more preferably from about 1-30% by weight, and most preferably from about 5-25% by weight. The weight ratio of vanadium oxide to promoter is preferably within the range of about 10:1 to 1:10, more preferably between about 5:1 to 1:5, and most preferably between about 4:1 to 1:1.

The sorbent material is formed by mixing a vanadium oxide compound and an alkali metal promoter with at least one porous support. The vanadium oxide compound and promoter should be intimately contacted with the support so that the vanadium oxide compound and promoter become incorporated onto, into, or onto and into the support.

One avenue for accomplishing this intimate mixing is to dispense the vanadium oxide and promoter in a first solution. Water is a preferred solvent for forming this solution, however, any solvent capable of dissolving both the vanadium oxide and promoter may be used. When dispersed in an aqueous solution, the vanadium oxide comprises from about 0.5-70% by weight of the solution, more preferably between about 5-60% by weight, and most preferably from about 10-50% by weight. Similarly, when dispersed in an aqueous solution, the promoter comprises from about 0.05-50% by weight of the solution, more preferably from about 0.5-40% by weight, and most preferably from about 1-30% by weight. At the same time, the porous support is dispersed in a second solution, with water being a preferred solvent.

If an alkali metal hydroxide is selected as the promoter that is mixed with the vanadium oxide compound, generally, at least a portion of the alkali metal hydroxide reacts with at least a portion of the vanadium oxide compound to form an alkali metal vanadate, also referred to herein as a "promoter."

The first and second solutions are then mixed together thereby loading the vanadium oxide and promoter onto, into, or onto and into the support. The mixture is then dried, and preferably, the resulting sorbent material is in a granular or powder form. It is possible that the porous support used is not in a finely divided form prior to mixing with the vanadium oxide and promoter solution. If such is the case, it is preferable to crush and sieve the dried sorbent material to an acceptable particle size for a given application. The sorbent material may also be pelletized, formed into monoliths, or incorporated into a foam in order to render it suitable for a specific application.

The inventive sorbent material is particularly useful in the removal of heavy metals and heavy metal containing compounds from fluid streams, especially flue gas streams produced by the combustion of hydrocarbon-containing materials such as coal and petroleum fuels. As noted above, such fluid streams are often contaminated with at least one heavy metal or compound containing a heavy metal selected from the group consisting of arsenic, beryllium, lead, cadmium, chromium, nickel, zinc, mercury, and barium. In one aspect, methods of removing heavy metal and heavy metal containing compounds from fluid streams comprise providing a sorbent composition according to the present invention and contacting the stream with the inventive sorbent.

Flue gas, such as that created by the combustion of hydrocarbon-containing compounds, generally comprises at least about 10% by weight $N_2$, more preferably at least about 50% by weight, and most preferably between about 75-90% by weight. Flue gas also generally comprises less than about 10% by weight of uncombusted hydrocarbons, more preferably less than about 5% by weight, and most preferably less than about 1% by weight. As described below, in a particularly preferred application, the flue gas will have already been treated for removal of $NO_x$ and $SO_x$ prior to any heavy metal removal process as the presence of high levels of $NO_x$ and $SO_x$ compounds may lead to fouling of the heavy metal removal sorbents. Generally, the flue gas comprises less than about 800 ppm of $SO_x$ compounds such as $SO_2$, more preferably less than about 500 ppm, and most preferably less than about 400 ppm. Also, the flue gas preferably comprises less than about 400 ppm $NO_x$ such as $NO$ and $NO_2$, more preferably less than about 250 ppm, and most preferably less than about 150 ppm. Flue gas may also comprise between about 2.5-10% by weight $O_2$, between about 1-5% by weight $CO_2$, and between about 5-20% by weight $H_2O$.

Preferably, the pressure drop associated with the contacting step should not exceed more than about 20 psia. More preferably, the pressure drop in the fluid stream is less than about 10 psia, and most preferably less than about 5 psia. Typically, flue gas streams do not flow under high pressures. Therefore, if the pressure drop is too great, back pressure is created and can affect the combustion process by which the flue gas is created. The arrangement of the sorbent material in the vessel in which contacting occurs can assist in minimizing this pressure drop. Preferably, the sorbent material comprises finely divided particles that are suspended in the fluid stream during the contacting step. Alternatively, the sorbent material may be positioned in a fluidized bed, placed in a packed bed column, formed into monoliths, or incorporated into a foam. With the latter arrangements, pressure drop may become much more of a concern and may require the use of fans or other equipment to increase the pressure of the flue gas stream.

The fluid stream containing the heavy metal contaminant preferably has a temperature of between about 50-400° F. during the contacting step, more preferably between about 100-375° F., and most preferably between about 200-350° F. The temperature of the fluid stream at the contacting stage is in part affected by upstream processes such as particulate removal systems (i.e., cyclones), other contaminant removal systems, heat exchange systems, etc. The contacting step results in the sorption of at least about 80% by weight of the heavy metals contained in the fluid stream, more preferably at least about 90% by weight, even more preferably at least about 9% by weight, and most preferably at least about 98% by weight. As previously stated, the vanadium oxide incorporated support material exhibits a high capacity for sorbing heavy metals and heavy metal containing compounds. Preferably, the vanadium oxide material is capable of sorbing at least about 1 atom of a heavy metal per every 5 atoms of vanadium. More preferably, the ratio of heavy metal atoms sorbed to vanadium atoms is at least about 1:3, and most preferably 1:1.

The sorbent material also exhibits the ability to oxidize the elemental heavy metal into a heavy metal containing compound such as a heavy metal oxide or chloride. Using mercury as an example, the sorbent material oxidizes mercury into various oxidized species such as $Hg^{+1}$, $Hg^{+2}$, or mercury compounds such as HgO, HgCl, and $HgCl_2$. At times, due to system inefficiencies or sorbent saturation, some of these heavy metal containing compounds may desorb or break free from the sorbent material. In that case, it can be particularly useful to employ a downstream heavy metal compound removal system in conjunction with the above-described sorbent system. In the heavy metal compound removal system, the gaseous product stream is contacted with a separate adsorbent in an adsorption zone. The adsorbent can be any adsorbent capable of adsorbing a heavy metal; however, preferred materials for removing the heavy metal compounds include those having a hydrophobic surface with pore openings of less than about 10 Å, and high pore volumes. More preferably, the adsorbent comprises, consists of or consists essentially of a material selected from the group consisting of a zeolite, amorphous carbon and combinations thereof. The amorphous carbon can be an activated carbon and/or activated charcoal. Exemplary zeolites include those with 8-12 member ring openings, and particularly ZSM-5 zeolite. Furthermore, the material may be in the form of granules, pellets, monoliths, powders that are collected on filters, or combinations thereof. A treated gaseous product stream is withdrawn from the adsorption zone and contains less than about 20 weight %, preferably less than about 10 weight %, and more preferably less that about 5 weight % of the heavy metal in the gaseous feed stream.

The heavy metal compound removal system may be contained in a separate downstream vessel from the vanadium oxide sorbent, or can be situated along with the vanadium oxide sorbent in a multiple stage contacting vessel so that the flue gas first contacts the vanadium oxide sorbent followed by the heavy metal compound removal sorbent.

While the vanadium oxide sorbent material exhibits a relatively high capacity for sorbing heavy metals and heavy metal containing compounds, its cost is relatively higher than the cost for conventional heavy metal compound sorbent materials such as zeolite. Therefore, from an economic standpoint, it may be desirable to employ a relatively small amount of the vanadium oxide sorbent compared to the conventional sorbent material. Once the sorptive capacity of the vanadium oxide sorbent has sufficiently diminished, it will not be able to sorb sufficient quantities of the heavy metal containing compounds formed by the catalytic action of the vanadium oxide sorbent. These heavy metal containing compounds may then be sorbed by the lesser expensive heavy metal compound sorbent material located downstream from the vanadium oxide sorbent.

The heavy metal compound removal system preferably results in the sorption of at least about 80% by weight of the heavy metal containing compounds that break through the vanadium oxide sorbent material, more preferably at least about 90% by weight, and most preferably at least about 95% by weight.

In addition to the vanadium oxide sorbent material becoming saturated, the overall sorptive efficiency may be affected by the presence of $NO_x$ and $SO_x$ compounds present in the flue gas. For example, $SO_2$ contained in the flue gas stream may be oxidized to $SO_3$ and then converted to $H_2SO_4$ in the presence of water. The $H_2SO_4$ then may fill the pores of the vanadium oxide sorbent thereby decreasing the sorptive capacity thereof and blocking active catalyst sites. Therefore, it is preferable to employ an upstream $NO_x$ and $SO_x$ removal process in order to avoid fouling of the vanadium oxide sorbent material. Any conventional $NO_x$ and $SO_x$ removal process would be suitable for use with the present invention. The $NO_x$ and $SO_x$ removal process should preferably remove at least about 50% by weight of all $NO_x$ and $SO_x$ present in the flue gas stream. It is preferable for the flue gas stream immediately prior to contact with the vanadium oxide sorbent to comprise less than about 400 ppm $NO_x$, more preferably less than about 250 ppm, and most preferably less than about 150 ppm. Likewise, it is preferable for the flue gas stream immediately prior to contact with the vanadium oxide sorbent to comprise less than about 800 ppm $SO_x$, more preferably less than about 500 ppm, and most preferably less than about 400 ppm.

The heavy metal compound removal system is capable of performing effectively even at high flue gas flow rates (i.e., greater than 10,000 gas hourly space velocity). The sorbent material used in the heavy metal compound removal system may be placed in a fluidized or packed bed vessel, however, as with the vanadium oxide sorbent material system above, the pressure drop of the flue gas stream should be minimized to avoid requiring the use of additional equipment to compensate for the pressure drop.

EXAMPLE

The following example illustrates preferred sorbent materials and methods of making the same in accordance with the present invention. This example should not be taken as limiting the scope of the present invention in any way.

In this example, a sorbent material according to the present invention was prepared by forming a solution comprising 17.816 g of $LiOH.H_2O$ and 77.229 g of $V_2O_5$ dissolved in 60 g of deionized water. A separate dispersion was prepared containing 60 g of deionized water, 30 g of alumina (DISPAL), 60 g of expanded perlite, and 20 g of calcined Kaolin or more generally calcined clay, or more specifically meta Kaolin. The solution and dispersion were mixed together forming a thick, paste-like material. This material was extruded through a ⅛ inch die and dried overnight at 248° F. The next day, the extrudate was crushed so as to form a granular material that could be passed through a 20-40 mesh sieve.

The material was then tested for efficacy in removing elemental mercury entrained in an air stream at a concentration of approximately 1000 µg/m³ (ppb w/v). Approximately 0.97 g of the sorbent was placed in a fixed bed reactor, the temperature of which was held constant at 300° F. The air flow rate through the fixed bed reactor was fixed at a gas hourly space velocity of >10,000 (approximately 200 mL/min). The air stream entering and exiting the fixed bed reactor was periodically analyzed using a Jerome Mercury Analyzer.

Figure 2:
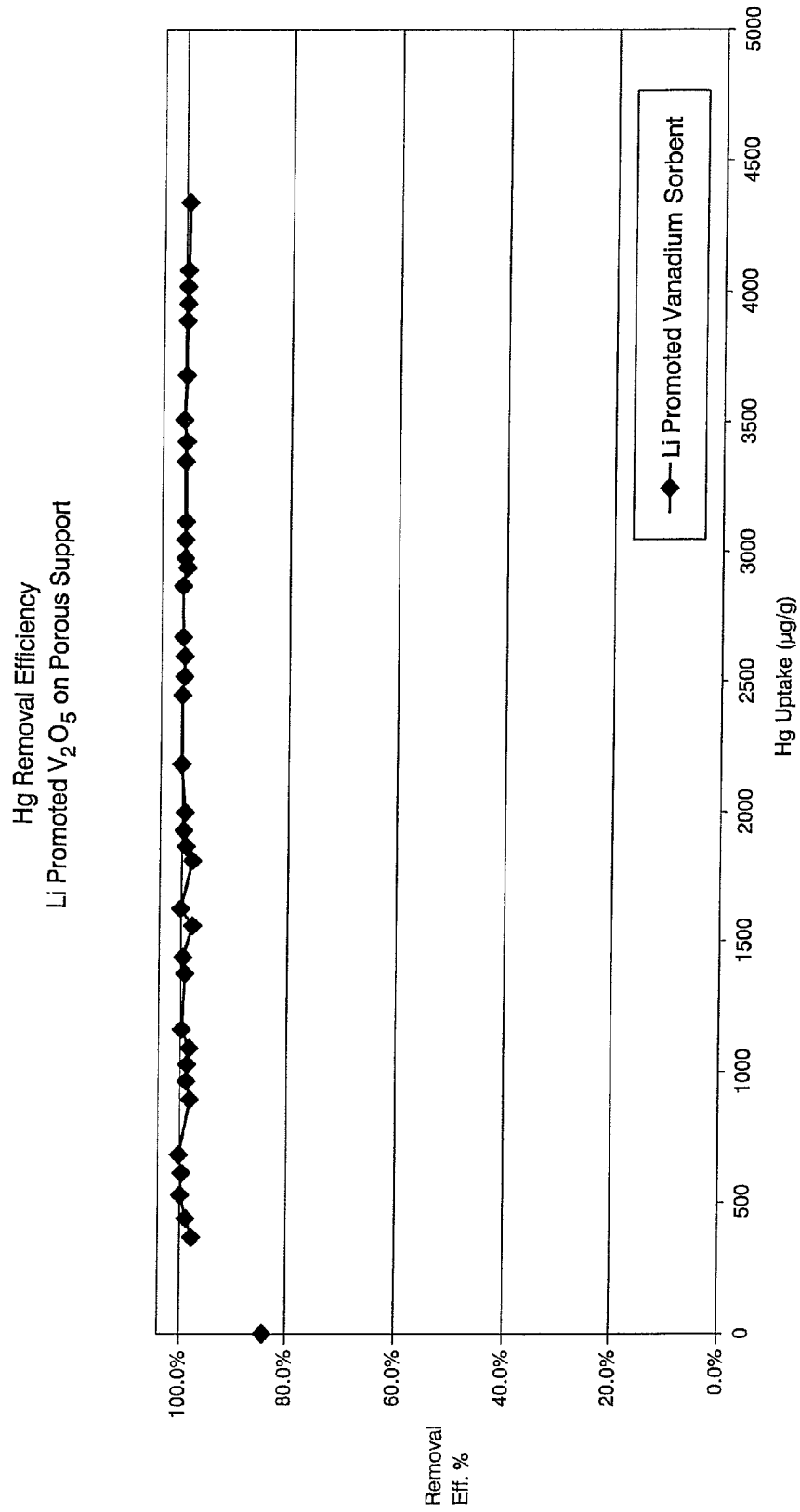
FIG. 2 is a graph of the mercury removal efficiency for a lithium promoted $V_2O_5$ sorbent on a porous support.

FIG. 1 shows the mercury uptake versus the mercury breakthrough of the sorbent material. For purposes of comparison, literature data for sulfur impregnated activated charcoal (SIAC), a conventional sorbent for this application, is also shown. The lithium promoted $V_2O_5$ sorbent demonstrated excellent capacity for sequestering mercury when compared with the SIAC literature data. FIG. 2 further demonstrates the effectiveness of the sorbent in removing mercury from the air stream in terms of efficiency of the sorbent versus mercury uptake. The sorbent exhibited greater than 95% efficiency over extended test periods. In sum, the test results indicate that the lithium promoted $V_2O_5$ sorbent material has a high capacity for sorbing mercury and is exceptionally efficient in mercury removal.

That which is claimed is:

1. A method of removing mercury or mercury containing compound from a fluid stream, said method comprising the step of:
    (a) contacting said fluid stream with a porous support material having incorporated onto, into, or onto and into a vanadium oxide compound and an alkali metal promoter for sorption of at least a portion of mercury or mercury containing compound, wherein the porous support having the vanadium oxide compound and the alkali metal promoter incorporated is not exposed to temperatures above 400° F. prior to and during the contacting.

2. A method in accordance with claim 1 wherein said vanadium oxide incorporated support material oxidizes said mercury into an oxidized mercury species or mercury containing compound.

3. A method in accordance with claim 1 wherein said porous support material is selected from the group consisting of amorphous silica-alumina, a zeolite, a material comprising meta-kaolin, alumina, expanded perlite, and combinations thereof.

4. A method in accordance with claim 1 wherein said vanadium oxide compound comprises $V_2O_5$, a hydrate of $V_2O_5$, a peroxo complex of vanadium oxide, or mixtures thereof.

5. A method in accordance with claim 1 wherein said promoter is selected from the group consisting of lithium vanadate, lithium hydroxide, and mixtures thereof.

6. A method in accordance with claim 1 wherein said contacting step results in a pressure drop in said fluid stream of less than about 20 psia.

7. A method in accordance with claim 6 wherein said contacting step results in a pressure drop in said fluid stream of less than about 10 psia.

8. A method in accordance with claim 1 wherein said fluid stream has a temperature between about 50-400° F. during said contacting step.

9. A method in accordance with claim 1 wherein said vanadium oxide incorporated support material comprises finely divided particles that are suspended in said fluid stream during said contacting step, pelletized particles placed in a fixed or fluidized bed, monoliths, or combinations thereof.

10. A method in accordance with claim 1 wherein said contacting step results in the sorption of at least about 80% by weight of the mercury or mercury containing compound contained in said fluid stream.

11. A method in accordance with claim 1 wherein said vanadium oxide incorporated support material is capable of sorbing at least about 1 atom of said mercury per every 5 atoms of vanadium.

12. A process for the removal of or mercury containing compound from a flue gas stream produced by the combustion of a hydrocarbon-containing fuel comprising the steps of:
    (a) contacting said flue gas stream with a first sorbent material comprising a porous support having incorporated onto, into, or onto and into a vanadium oxide compound and an alkali metal promoter for sorbing at least a portion of mercury or mercury containing compound present in said flue gas stream, wherein the porous support having the vanadium oxide compound and the alkali metal promoter incorporated is not exposed to temperatures above 400° F. prior to and during the contacting; and
    (b) contacting said flue gas with a second sorbent material different from said first sorbent material for sorbing at least a portion of said mercury-containing compound not sorbed during step (a).

13. A process as recited in claim 12 wherein said second sorbent material comprises a material selected from the group consisting of porous zeolite materials, amorphous carbons, and combinations thereof.

14. A process as recited in claim 13 wherein said amorphous carbons are selected from the group consisting of activated charcoal, activated carbon, and combinations thereof.

15. A process as recited in claim 13 wherein said porous zeolite material comprises ZSM-5 zeolite.

16. A process as recited in claim 12 wherein said vanadium oxide compound comprises $V_2O_5$, a hydrate of $V_2O_5$, a peroxo complex of vanadium oxide, or combinations thereof.

17. A process as recited in claim 12 wherein step (a) results in a pressure drop in said flue gas stream of less than about 20 psia.

18. A process as recited in claim 12 wherein said flue gas stream has a temperature between about 50-400° F. during step (a).

19. A process as recited in claim 12 wherein said vanadium oxide incorporated support material comprises finely divided particles that are suspended in said flue gas stream during step (a), pelletized particles placed in a fixed or fluidized bed, monoliths, or combinations thereof.

20. A process as recited in claim 12 wherein step (a) results in the sorption of at least about 80% by weight of said mercury or mercury containing compound contained in said flue gas stream.

21. A process as recited in claim 12 wherein step (b) results in the removal of at least about 80% by weight of said mercury from the flue gas stream leaving step (a).

22. A process as recited in claim 12 wherein said alkali metal promoter is selected from the group consisting of lithium vanadate, lithium hydroxide, and mixtures thereof.

23. A process as recited in claim 12 wherein prior to step (a) said process includes removal of at least about 50% by weight of all $NO_x$ and $SO_x$ present in said flue gas.

24. A process as recited in claim 12 wherein said flue gas stream comprises less than about 400 ppm $NO_x$ and less than about 800 ppm $SO_x$ immediately prior to step (a).

25. A process as recited in claim 12 wherein said vanadium oxide incorporated support material oxidizes said mercury into an oxidized mercury species or mercury containing compound during step (a).

* * * * *